US00H002054H

(19) United States

(12) Statutory Invention Registration

Bennett

(10) Reg. No.: US H2054 H

(43) Published: Dec. 3, 2002

(54) MACHINERY FIRE MITIGATION SYSTEM AND METHOD

(75) Inventor: Joseph M. Bennett, Huber Heights, OH (US)

(73) Assignee: The United States of America as represented by the Secretary of the Air Force, Washington, DC (US)

(21) Appl. No.: 09/415,239

(22) Filed: Oct. 12, 1999

(51) Int. Cl.[7] ..... B27N 9/00

(52) U.S. Cl. ..... 428/920; 428/921

(58) Field of Search ..... 428/920, 921

(56) References Cited

U.S. PATENT DOCUMENTS 5,105,592 A * 4/1992 MacMillan et al. ..... 52/232
5,456,050 A * 10/1995 Ward ..... 52/220.8
5,953,872 A * 9/1999 MacMillan et al. ..... 52/220.8
6,153,674 A * 11/2000 Landin ..... 524/35

* cited by examiner

*Primary Examiner*—Michael J. Carone
*Assistant Examiner*—Aileen J. Baker
(74) *Attorney, Agent, or Firm*—Bobby D. Scearce; Thomas L. Kundert

(57) ABSTRACT

In accordance with the foregoing principles and objects of the invention, the mitigation of fires in machinery enclosures is achieved by strategic placement of thin narrow strips of intumescent material within the ventilated space between the machinery and a housing enclosing the machinery, whereby, in the event of a fire, the resulting flame contacts the intumescent material causing it to swell and to effectively block air flow through the ventilated space.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MACHINERY FIRE MITIGATION SYSTEM AND METHOD

RIGHTS OF THE GOVERNMENT

The invention described herein may be manufactured and used by or for the Government of United States for all governmental purposes without the payment of any royalty.

BACKGROUND OF THE INVENTION

The present invention relates generally to systems and methods for suppressing machinery fires, and more particularly to an economical method and lightweight system for mitigating fires in machinery enclosures utilizing intumescent materials.

Aircraft engine nacelles and other housings for hot operating machinery may also enclose fluid lines on the exterior of the machinery that provide flammable fuel, oil or hydraulic/brake fluid to the operating machinery. The enclosures are typically ventilated with forced airflow (by fan or free air stream) to prevent accumulation of flammable vapors and to provide some cooling to the machinery. In a typical fire scenario, a ruptured fluid line leaks flammable fluid onto the hot machinery resulting in a fire. The ventilation airflow continues to support the fire and directs the flame downstream. An upstream extinguishing system may be activated to extinguish the fire, but because of rapid dilution by the ventilation airflow, short residence time of the extinguishant near the fire and robustness of the flame, many fires are not extinguishable with the limited quantity of extinguishant available in weight sensitive applications such as aboard an aircraft. After initial extinguishment, the fire may re-ignite because of continued fluid flow onto the hot machinery surface combined with replenished airflow across the hot surface after the extinguishant is exhausted. Replacement chemicals for Halons previously having widespread use in extinguishers are substantially less effective than Halons. Existing systems therefore have limited success or require extinguishant quantities and hardware that are impractical in many machinery applications.

The invention solves or substantially reduces in critical importance problems in the prior art by providing a system and method for suppressing fires in machinery spaces by strategic placement of intumescent materials within the machinery space. Intumescent materials are substances that react chemically when impinged by intense heating sources such as fire. The reactions change both chemical makeup, structure and volume of the material as a means of accommodating the thermal energy applied. The responses of the intumescent materials protect the structures on which they are applied, by dissipating heat or providing an insulative barrier to prevent thermal damage to the internal structure. The intumescent materials typically initiate endothermic chemical reactions when impinged by a heat source, which extract and process the heat applied to sustain the reaction, as opposed to raising the temperature of the material. The intumescents may also physically swell dramatically in size (2 to 50 times the original thickness), and form an insulative porous char on the outer surface. For example, a 1 mm layer of intumescent of about 1.5 g/cm$^3$ density may expand to form a non-cumbustible layer 2 mm to 50 mm thick, with a density of 0.7 g/cm$^3$ to 0.03 g/cm$^3$. Intumescent formulations are generally composed of three active classes of ingredients, including an acid source, a carbonific source and a spumific agent. A series of chemical and physical events combine to control intumescence. As the virgin material is exposed to heat, the temperature rises, releasing an inorganic acid. In the presence of an inorganic catalyst, the acid is thought to react with carbon compounds forming a melt. An endothermic reaction subsequently releases gases that form bubbles, resulting in an intumescent foam that solidifies into a multicellular char. Cellular voids are filled with gases, causing the char to act as an insulating barrier. The gases are principally CO and $H_2O$, although small amounts of $CH_4$ and $H_2$ are also found. The char will not burn but will reject heat by radiating it away. As flame heating continues, this process occurs in depth, layer after layer, until the material is depleted or the incident heat flux is reduced. The final form of the intumesced layer acts as an insulating barrier, which protects the underlying material from flame heat flux. Intumescent material formulations are highly proprietary and unique to various manufacturers, and include latex, epoxy and oil based varieties, as well as some mastics or caulks. Some formulations include ceramic fibers (Hamins, 1998, "Evaluation of Intumescent Body Panel Coatings in Simulated Post-Accident Vehicle Fires," Report #NHTSA-1998-3588-24; NISTIR 6157). If a fire occurs, the intumescent material swells upon heating to several orders of magnitude of its original thickness and blocks the air flow in the vicinity of the fire, depriving the fire of oxygen and facilitating extinguishment. The intumescent material can be applied as a lightweight narrow thin strip or as one or more rings on the machinery exterior, and may preferably be located to swell against the enclosure at locations where clearance is minimal. In this manner, a series of fire walls can be formed using a minimal quantity of intumescent material. The effectiveness of any other extinguishing system used on the machinery is improved because the intumescent material weakens the fire and reduces air dilution of the extinguishant. The invention may, however, obviate the need altogether for conventional extinguishment systems in machinery applications. The unexpanded intumescent material does not significantly impede airflow around the machinery during normal operation.

The invention finds utility in applications where extinguishing systems may not be justified, such as in unmanned aerial vehicles. The invention may also be used in aircraft engine nacelles and other bays where flammable fluids are present, in armored vehicle engine compartments, battlefield equipment or electronic trailers, naval ship machinery enclosures, stationary turbines, and marine engines, buses and other automotive transportation equipment, fixed generator and compressor units, power equipment trailers, petrochemical facilities, and other applications where liquid-fueled, oiled or hydraulically controlled equipment is operated. The use of intumescent material according to the invention requires no power or periodic maintenance and is highly reliable.

It is therefore a principal object of the invention to provide system and method for suppressing machinery fires.

It is another object of the invention to provide a fire suppression system and method for the engine compartment of a vehicle.

It is another object of the invention to provide a lightweight system for suppressing machinery fires.

It is another object of the invention to provide a machinery fire extinguisher system that does not impede airflow around the machinery during normal operation.

It is another object of the invention to provide a reliable machinery fire extinguisher system having no operational power or periodic maintenance requirements.

It is yet another object of the invention to provide system and method for suppressing machinery fires utilizing intumescent materials.

It is a further object of the invention to provide method and system for suppressing fires in machinery spaces that do not use conventional, environmentally harmful extinguishants.

These and other objects of the invention will become apparent as a detailed description of representative embodiments proceeds.

SUMMARY OF THE INVENTION

In accordance with the foregoing principles and objects of the invention, the mitigation of fires in machinery enclosures is achieved by strategic placement of thin narrow strips of intumescent material within the ventilated space between the machinery and a housing enclosing the machinery, whereby, in the event of a fire, the resulting flame contacts the intumescent material causing it to swell and to effectively block air flow through the ventilated space.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
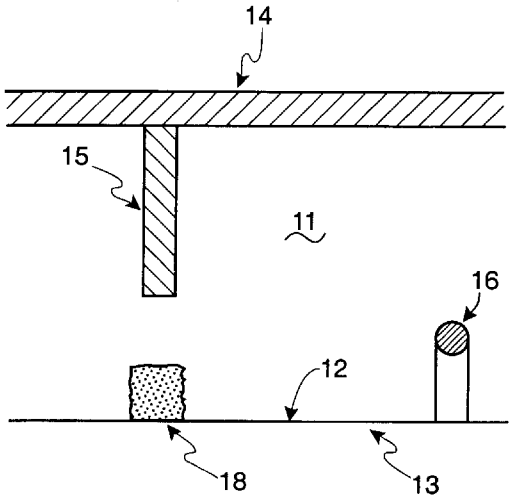
FIG. 1 shows a schematic cross-sectional view of the region between the exterior of a piece of hot operating machinery and a housing that encloses the machinery.

Referring now to the drawings, FIG. 1 shows a schematic view in cross-section of the region 11 between the exterior surface 12 of an item of hot operating machinery 13 and the enclosure or housing 14 (e.g. a nacelle surrounding an aircraft engine) that surrounds machinery 13. During operation of machinery 13, the exterior surface 12 thereof may be hot enough to ignite fluids within region 11 or near a source of electrical energy such as a wire bundle or connection. Housing 14 may be spaced an appreciable distance from machinery 13 in defining region 11. For purposes of illustration here, region 11 is selected and defined near a structural rib or other support structure 15, and the clearance between support structure 15 and surface 12 of machinery 13 may be relatively small (e.g. 1–3 inches). Other structural components or characteristics, such as housing contours and conduits or other components near or attached to machinery 13, may also be present or used as substitutes to the ribs that also result in small local clearances. Region 11 may define a passageway for coolant or ventilation flow around machinery 13 or for providing an air intake for combustion of fuel within machinery 13. Region 11 may also comprise a location for one or more fluid conduits 16 that supply fuel, oil or other combustible fluid for fueling or servicing machinery 13. In accordance with a principal feature of the invention, a strip of intumescent material 18 is applied to the surface of machinery 13, or to the housing 14 enclosing machinery 13, in one or more locations along the surface of machinery 13, preferably at those locations of region 11 of substantially reduced clearance between machinery 13 and housing 14, such as at structural rib 15 or other structural component supporting machinery 13. In a region of relatively wide clearance between machinery 13 and housing 14, it may be desirable to apply strips of intumescent material in confronting relationship on both the machinery surface and the interior surface of housing 14, so that the two strips, when contacted by a flame, will expand toward each other to form an effective blockage of air flow through region 11. The intumescent material may be applied as thin strips or as a layer of viscous liquid which hardens in place after application.

Figure 2:
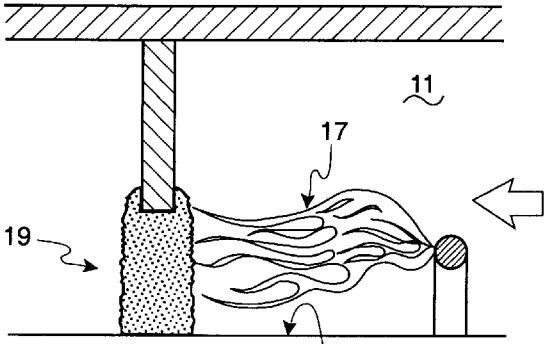
FIG. 2 shows a flame originating from a fluid conduit leak in the arrangement of FIG. 1.

In the event of rupture of conduit 16, fluid leaking from conduit 16 may ignite as a source of flame 17 propagating downstream within region 11. Referring now additionally to FIG. 2, shown therein is such a flame 17 ignited from a leak occurring from a ruptured conduit 16. Given that the airflow within region 11 is in the direction of the arrow shown in FIG. 2, flame 17 would be directed downstream in the direction of the airflow. Heat from flame 17 would thus contact a strategically located strip 18 of intumescent material applied along the surface of machinery 13 within region 11, as suggested in FIGS. 1 and 2. It is noted that an intumescent material can expand to twelve times or more its initial size when contacted by a flame. Accordingly, upon contact by flame 17, material 18 could expand to several times its original thickness and form a barrier 19 between machinery 13 and housing 14 to effectively block air flow through region 11 and consequently to weaken and extinguish the fire by oxygen starvation. The expanded intumescent material forms a carbonaceous structure, often with an outer char layer, defining an effective thermal barrier.

Figure 3:
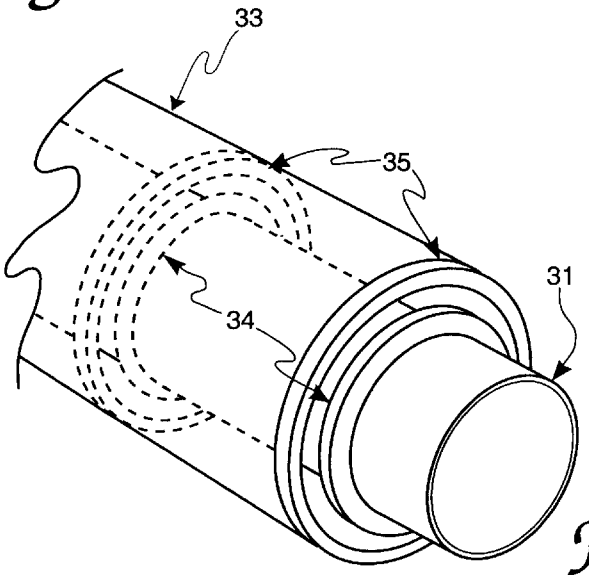
FIG. 3 shows schematically in three dimensions representative locations for placement of an intumescent material within a housing of an item of operating machinery according to the invention.

Referring now to FIG. 3, shown schematically therein in perspective is an item of machinery enclosed within a housing, such as an engine 31 enclosed within surrounding nacelle housing 33 on an aircraft. In accordance with the principal feature of the invention, intumescent material may be disposed at one or more locations within housing 33 near or on the outer surface of engine 31. FIG. 3 illustrates two such representative locations. Accordingly, narrow strips of intumescent material 34 may be placed on the outer surface of engine 31, preferably near any region of reduced clearance between engine 31 and housing 33, such as near any of the annular ribs 35 which are typically part of a nacelle housing 33 structure supporting engine 31 and which encircle the interior surface of housing 33. In the placement of strips of intumescent material 34, it may be important to ensure that the material subtends the total extent (for example, entire circumference of any annular region around engine 31) of the region where fire prevention is intended using the invention. Accordingly, each strip of intumescent material 34, when contacted by heat occasioned by a fire occurring within housing 33 will expand at its location downstream of the fire to span the gap between engine 31 and housing 33 and effectively block air flow through the region defined between engine 31 and housing 33. It should be noted that strips of intumescent material would be needed only in a limited region between the machinery and its housing where a fire is most likely to originate.

Substantially any intumescent material may be used in the practice of the invention as might occur to the skilled artisan guided by these teachings, including, but not necessarily limited to, Pitt-Char XP by PPG, No-Fire Technologies, Inc., 3-6077 silicone ablative by Dow Coming, Sylramic 3-9173 and 93-104 Ablative by Dow Corning, ICI Fiberite MVE-C615, MXBE350, FM16771 and MXE-C725, Structural Polymer Systems, Inc., CA6304, FMIFTR402, BLM/E and FR1, Allied Signal Blackglas, Haveg CD208, H41N, and H41NE, Thermal Designs KMASS, Mosites Aflas, Aeortherm Acusil I/II, Global Technology P50 Cork, Pfizer FirexRX-2390/2376/2555, Norton Duroid 5667, Textron Chartek IV/59C, C-7, FM-26, Avcoat 480/5026H/CG, NASA BTA, Ameron Amercoat 333, LMVS MI15, ARC ARI-2820B, Kirkhill KL60-269, Fiber Materials Inc. Flex Foam 605, Lanxide Ceraset SN, Ametek Havaflex TA-117/118/119, Thermal Designs KMASS-M/C, Space Age Technology Thermique Fire Shield, RM Engineered Products Refset, RL-4389/4495, NU Sil R2760/R2511, Martin Marietta MMA-25S-1/2, and DeSoto Korotherm. For most of the intumescent materials just mentioned, upon contact by a flame in the temperature range above about 200° C., expansion in thickness of from about 2 to 50 times the original applied thickness is achieved. In the application of the invention to control/prevention of fires within an aircraft, weight considerations of adding the intumescent material to the aircraft may be important. For example, if one considers a strip 0.5 inches in width, 0.2 inches thick (to seal up a clearance gap of 2 inches or more) spread over an engine core of 30 inches diameter, then a total volume of 0.005447 cubic feet per ring would result. Accounting for the densities of the products just mentioned, a weight range of 0.393 to 0.460 lb. per ring would exist. Even if four rings were used at various regions of the nacelle, then a total weight of only 1.572 to 1.84 pounds would be added. This weight is minimal in comparison to the size of extinguisher systems that are currently used, which can range from 10 to 20 pounds per engine.

The invention therefore provides system and method for suppressing fires in machinery enclosures. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A method for suppressing fires within a housing enclosing operating machinery and defining a passageway between the machinery and the housing for the passage of coolant air flow therethrough, said method comprising the steps of:

(a) providing a quantity of intumescent material;

(b) applying a first layer of said intumescent material to at least one of the outer surface of the machinery and the inner surface of the housing, said layer only partially filling the passageway between the machinery and the housing whereby air flow therethrough is substantially unrestricted; and (c) whereby, in the event of a fire within the housing, heat from the fire will contact the intumescent material causing it to swell and to effectively block air flow through the passageway between the machinery and the housing.

2. The method of claim 1 wherein the step of applying a layer of said intumescent material is performed using strips of said intumescent material applied at a plurality of locations within the passageway between the machinery and the housing.

3. The method of claim 1 further comprising the step of applying a second layer of said intumescent material in confronting relationship to said first layer on the other of the outer surface of the machinery and to the inside surface of the housing.

4. The method of claim 1 wherein said step of applying a layer of said intumescent material is performed by applying a layer of viscous liquid intumescent material that hardens in place after application.

5. The method of claim 1 wherein said layer of said intumescent material substantially completely encircles the machinery enclosed within the housing.

* * * * *